United States Patent
Inoue

(10) Patent No.: US 9,758,704 B2
(45) Date of Patent: Sep. 12, 2017

(54) HOT MELT ADHESIVE

(71) Applicant: HENKEL AG & CO. KGAA, Duesseldorf (DE)

(72) Inventor: Kentarou Inoue, Osaka (JP)

(73) Assignee: HENKEL AG & CO. KGAA, Duesseldorf (DE)

( * ) Notice: Subject to any disclaimer, the term of this patent is extended or adjusted under 35 U.S.C. 154(b) by 0 days.

(21) Appl. No.: 14/632,688

(22) Filed: Feb. 26, 2015

(65) Prior Publication Data

US 2015/0166849 A1 Jun. 18, 2015

Related U.S. Application Data

(63) Continuation of application No. PCT/JP2013/073461, filed on Aug. 26, 2013.

(30) Foreign Application Priority Data

Aug. 28, 2012 (JP) ................ 2012-187361

(51) Int. Cl.
| | |
|---|---|
| *C09J 123/12* | (2006.01) |
| *C09J 11/06* | (2006.01) |
| *C09J 11/08* | (2006.01) |
| *C09J 123/08* | (2006.01) |
| *C08L 23/12* | (2006.01) |
| *C08L 53/02* | (2006.01) |

(52) U.S. Cl.
CPC .......... *C09J 123/12* (2013.01); *C09J 11/06* (2013.01); *C09J 11/08* (2013.01); *C09J 123/0807* (2013.01); *C08L 23/12* (2013.01); *C08L 53/025* (2013.01); *C09J 2201/61* (2013.01)

(58) Field of Classification Search
CPC . C09J 123/12; C09J 11/08; C09J 11/06; C09J 2201/61; C09J 123/0807; C08L 23/12; C08L 53/025; C08L 25/00; C08L 23/12; C08L 23/0807
USPC .............. 524/505, 525, 50; 525/98
See application file for complete search history.

(56) References Cited

U.S. PATENT DOCUMENTS

| | | | |
|---|---|---|---|
| 4,286,077 A | 8/1981 | St. Clair et al. | |
| 4,361,672 A | 11/1982 | Agarwal et al. | |
| 5,418,052 A | 5/1995 | Sugie et al. | |
| 6,099,900 A | 8/2000 | Minamizaki | |
| 6,184,285 B1 | 2/2001 | Hatfield et al. | |
| 6,582,829 B1* | 6/2003 | Quinn .......... | C08F 210/16 428/513 |
| 6,627,723 B2 | 9/2003 | Karandinos et al. | |
| 6,747,114 B2 | 6/2004 | Karandinos et al. | |
| 6,887,941 B2 | 5/2005 | Zhou | |
| 7,459,503 B2 | 12/2008 | Kanamaru et al. | |
| 8,366,865 B2 | 2/2013 | Terfloth et al. | |
| 8,604,145 B2 | 12/2013 | Boone et al. | |
| 8,653,169 B2 | 2/2014 | Jiang et al. | |
| 2005/0014891 A1 | 1/2005 | Quinn | |
| 2005/0059759 A1 | 3/2005 | Sajot et al. | |
| 2005/0159566 A1* | 7/2005 | Minami .......... | C09J 123/10 526/134 |
| 2006/0074171 A1 | 4/2006 | Bach et al. | |
| 2007/0117907 A1 | 5/2007 | Bach et al. | |
| 2009/0110925 A1 | 4/2009 | Fukuda et al. | |
| 2010/0305259 A1 | 12/2010 | Rodriguez et al. | |
| 2011/0021102 A1* | 1/2011 | Inoue .......... | C09J 123/14 442/327 |
| 2013/0296476 A1 | 11/2013 | Yasui et al. | |
| 2014/0199907 A1 | 7/2014 | Moriguchi et al. | |
| 2015/0017868 A1* | 1/2015 | Stafeil .......... | C09J 157/02 442/381 |

FOREIGN PATENT DOCUMENTS

| | | |
|---|---|---|
| EP | 0285430 A2 | 10/1988 |
| EP | 1295925 A1 | 6/2003 |
| EP | 1637559 A1 | 3/2006 |
| EP | 2113541 A1 | 11/2009 |
| EP | 2290029 A1 | 3/2011 |
| EP | 2081609 B1 | 3/2012 |
| JP | 60120775 A | 6/1985 |
| JP | 4077591 A | 3/1992 |
| JP | 200196490 A | 4/2001 |
| JP | 2002519474 A | 7/2002 |
| JP | 2004137297 A | 5/2004 |
| JP | 2007169531 A | 7/2007 |
| JP | 2009242533 A | 10/2009 |
| JP | 2011511866 A | 4/2011 |
| JP | 2012187361 A | 10/2012 |
| WO | 0194690 A | 12/2001 |
| WO | 2006004750 A1 | 1/2006 |
| WO | 2009124059 A1 | 10/2009 |
| WO | 2012068576 A2 | 5/2012 |
| WO | 2012068703 A1 | 5/2012 |

* cited by examiner

*Primary Examiner* — Josephine Chang

(74) *Attorney, Agent, or Firm* — Sun Hee Lehmann

(57) ABSTRACT

A hot melt adhesive useful in high-speed coating and spiral coating at low temperature for adhering a polyolefin film to a nonwoven fabric and disposable products obtained by the same are provided. The hot melt adhesive comprises: (A) a thermoplastic block copolymer which is a copolymer of a vinyl-based aromatic hydrocarbon with a conjugated diene compound; (B) a propylene homopolymer having a melting point of 100° C. or lower which is obtainable by polymerizing propylene using a metallocene catalyst; and (C) an ethylene/α-olefin copolymer. The hot melt adhesive is excellent in high-speed coating and spiral coating at low temperature, and also provides excellent adhesion to a polyolefin film and a nonwoven fabric.

6 Claims, No Drawings

HOT MELT ADHESIVE

CROSS-REFERENCE TO RELATED APPLICATION

This application is a continuation of International Patent Application No. PCT/JP2013/073461 filed Aug. 26, 2013, which claims priority to Japanese Patent Application No. 2012-187361 filed Aug. 28, 2012, the contents of both of which are incorporated herein by reference.

FIELD OF THE INVENTION

The present invention relates to a hot melt adhesive, and more particularly to a hot melt adhesive which is used in the field of disposable products typified by a diaper and a napkin.

BACKGROUND OF THE INVENTION

A synthetic rubber-based hot melt adhesive containing a thermoplastic block copolymer as a main component has widely been used as a hot melt adhesive which is used in disposable products such as a diaper and a napkin and is applied to a base material thereof, for example, a nonwoven fabric, a tissue, a polyethylene film and the like.

JP 2004-137297 A discloses that a synthetic rubber-based hot melt adhesive containing a styrene-butadiene-styrene block copolymer as a main component can be employed in disposable products. In the case of producing disposable products, a base material such as a film or a nonwoven fabric is coated with a hot melt adhesive. In order to enhance production efficiency of the disposable products, a coating speed may be sometimes increased, that is, coating may be sometimes performed at a high speed. In particular, it is necessary to increase a discharge amount of the hot melt adhesive so as to coat at a high speed in the case of performing spiral coating. Therefore, it is necessary to set a pressure of hot air to be blown to a high value. However, when the synthetic rubber-based hot melt adhesive of JP 2004-137297 is sprayed under a high hot air pressure, the hot melt adhesive may be sometimes scattered.

One of means for enhancing production efficiency of the disposable products includes a method in which an olefin-based hot melt adhesive typified by an ethylene-propylene copolymer is applied at a high speed.

WO 2001-094690 A discloses that a propylene polymer can be used as a raw material for a hot melt adhesive. The polyolefin-based hot melt adhesive of WO 2001-09490 A develops high adhesive strength in the case of bonding a nonwoven fabric and a nonwoven fabric together. However, the adhesive is insufficient for the disposable products because of insufficient adhesion of the adhesive to a polyethylene film.

The disposable products such as a diaper and a sanitary napkin often have a structure in which an absorber constituted by a pulp, an absorbent polymer and the like is wrapped in a tissue and the outside of the tissue is covered with a nonwoven fabric, a polyethylene film and the like. Therefore, it is required for the hot melt adhesive for disposable products to have a strong adhesive strength to the nonwoven fabric and the polyethylene film.

JP 2009-242533 A discloses a hot melt adhesive containing a hydrogenated styrene-isoprene block copolymer (SEPS) and a polyolefin. The hot melt adhesive of JP 2009-242533 A shows satisfactory adhesion to a nonwoven fabric, but shows poor adhesion to a polyethylene film because of rigid design containing no oil component in principle, and thus it is hard to use in disposable products. Furthermore, since the adhesive of JP 2009-242533 A contains an amorphous polyolefin including a high-molecular weight component, the adhesive cannot obtain a sufficient width in spiral coating and has high viscosity. Therefore, the adhesive of JP 2009-242533 A was not suited for spiral coating to a polyethylene film at low temperature. In order to cope with a complicated coating pattern, it is necessary to decrease the viscosity by increasing a coating temperature. However, when the coating temperature is increased, the film as the base material may be melted and the coated hot melt adhesive may shrink due to cooling, resulting in the formation of wrinkles in the film.

JP 2002-519474 A discloses a hot melt adhesive obtained by mixing an ethylene/α-olefin interpolymer with a block copolymer. Example 14 of JP 2002-519474 A discloses a hot melt adhesive for disposable products obtained by mixing an ethylene/α-olefin interpolymer with a hydrogenated styrene block copolymer. Since this hot melt adhesive is obtained by blending the hydrogenated styrene block copolymer, adhesion to a polyethylene film is improved. However, since low cohesive force of the ethylene/α-olefin interpolymer leads to low adhesion between nonwoven fabrics, it is difficult to mention the hot melt adhesive as being a sufficient adhesive for disposable products.

SUMMARY OF THE INVENTION

An object of the present invention is to provide a hot melt adhesive which is excellent in high-speed coating and spiral coating at low temperature, and is also excellent in adhesion to a polyolefin film (preferably a polyethylene film) and a nonwoven fabric; and disposable products obtainable by using the hot melt adhesive.

After intense study, it has been determined that it is possible to obtain a polyolefin-based hot melt adhesive which is capable of spiral coating, particularly spiral coating at a high speed, and is also excellent in adhesion to a polyolefin film (preferably a polyethylene film) and a nonwoven fabric, and exhibits a long open time suited for a production line for sanitary materials, when blending a propylene homopolymer having narrow molecular weight distribution and also having low melting point, and an ethylene/α-olefin copolymer with a thermoplastic block copolymer.

They have also found that such olefin-based hot melt adhesive is suitable for use in disposable products, and thus the present invention has been completed.

That is, the present invention provides, as an aspect, a hot melt adhesive including:

(A) a thermoplastic block copolymer which is a copolymer of a vinyl-based aromatic hydrocarbon with a conjugated diene compound;

(B) a propylene homopolymer having a melting point of 100° C. or lower which is obtainable by polymerizing propylene using a metallocene catalyst; and (C) an ethylene/α-olefin copolymer.

The present invention provides, as an embodiment, the hot melt adhesive, wherein the thermoplastic block copolymer (A) contains at least one selected from:

(A1) a hydrogenated styrene-butadiene block copolymer (SEBS); and (A2) a hydrogenated styrene-isoprene block copolymer (SEPS).

The present invention provides, as a preferred embodiment, the hot melt adhesive, wherein the ethylene/a-olefin copolymer (C) contains at least one selected from an ethylene/propylene copolymer and an ethylene/1-octene copolymer.

The present invention provides, as a preferred embodiment, the hot melt adhesive, further including:
at least one selected from (D) a tackifier resin and (E) a plasticizer, wherein the plasticizer (E) contains at least one selected from (E1) a naphthene oil and (E2) a paraffin oil.

The present invention provides, as a most preferred embodiment, the hot melt adhesive, which contains the thermoplastic block copolymer (A) in the amount of 1.0 to 9.0 parts by weight and the ethylene/α-olefin copolymer (C) in the amount of 1.0 to 8.0 parts by weight, based on 100 parts by weight of the total weight of the entire adhesive.

The present invention provides, as another aspect, disposable products obtainable by using the above hot melt adhesive.

DETAILED DESCRIPTION OF THE INVENTION

Since the hot melt adhesive according to the present invention includes: (A) a thermoplastic block copolymer which is a copolymer of a vinyl-based aromatic hydrocarbon with a conjugated diene compound; (B) a propylene homopolymer having a melting point of 100° C. or lower which is obtainable by polymerizing propylene using a metallocene catalyst; and (C) an ethylene/α-olefin copolymer, the hot melt adhesive is excellent in high-speed coating and is excellent in spiral coating at low temperature, and is also excellent in adhesion to a polyolefin film (preferably a polyethylene film) and adhesion to a nonwoven fabric. Because of low solidification rate of the above hot melt adhesive, a base material is sufficiently impregnated with the adhesive when bonding is carried out by using a nip press in the production line for sanitary materials which needs a long open time, and thus the adhesive exhibits a sufficient adhesive force.

In the hot melt adhesive according to the present invention, when the thermoplastic block copolymer (A) contains at least one selected from: (A1) a hydrogenated styrene-butadiene block copolymer (SEBS); and (A2) a hydrogenated styrene-isoprene block copolymer (SEPS), compatibility with the component (B) is improved, and because of the improvement of the compatibility, an adhesive strength to a nonwoven fabric and a polyolefin film is improved.

Since the ethylene/α-olefin copolymer (C) contains at least one selected from an ethylene/propylene copolymer and an ethylene/1-octene copolymer, the hot melt adhesive according to the present invention exhibits low solidification rate and also exhibits sufficient adhesive force in the production line requiring a long open time.

When the hot melt adhesive according to the present invention further includes at least one selected from (D) a tackifier resin and (E) a plasticizer, and the plasticizer (E) contains at least one selected from (E1) a naphthene oil and (E2) a paraffin oil, the adhesion to a polyolefin film and a nonwoven fabric is further improved, and the viscosity further decreases, and thus the hot melt adhesive is more excellent in coating at low temperature (especially, spiral coating) and is more suitable for use in disposable products.

When the hot melt adhesive according to the present invention contains the thermoplastic block copolymer (A) in the amount of 1.0 to 9.0 parts by weight and the ethylene/α-olefin copolymer (C) in the amount of 1.0 to 8.0 parts by weight, based on 100 parts by weight of the total weight of the entire adhesive, the hot melt adhesive is excellent in high-speed coating and spiral coating at low temperature, and is also excellent in adhesion to a polyolefin film (preferably, polyethylene film) and a nonwoven fabric. Furthermore, because of its low solidification rate, the hot melt adhesive is also suited for the production line for disposable products which need a long open time and the adhesive is suited for use as a hot melt adhesive for disposable products.

Since disposable products according to the present invention are obtainable by using the above hot melt adhesive, the disposable products can be efficiently produced using a high-speed coating line and coating can be performed at low temperature of about 140° C., which causes higher safety. The disposable products are excellent in adhesion with regard to a nonwoven fabric and a polyolefin film, and are less likely to cause peeling.

The hot melt adhesive according to the present invention includes: or lower which is obtainable by polymerizing propylene using a metallocene catalyst; and (C) an ethylene/α-olefin copolymer which is obtainable by copolymerizing ethylene with α-olefin using a metallocene catalyst.

In the present invention, the "(A) thermoplastic block copolymer" refers to a block copolymer obtainable by block copolymerization of a vinyl-based aromatic hydrocarbon with a conjugated diene compound, and which block copolymer includes a copolymer (derivative or modification) derived from the block copolymer, wherein the block copolymer is at least one selected from an unhydrogenated block copolymer and a hydrogenated block copolymer, wherein the unhydrogenated block copolymer comprises a vinyl-based aromatic hydrocarbon block and a conjugated diene compound block; and the hydrogenated block copolymer is obtainable by hydrogenating the unhydrogenated block copolymer (thus the block copolymer includes a combination of the unhydrogenated block copolymer with the hydrogenated block copolymer). There is no particular limitation as long as the objective hot melt adhesive according to the present invention can be obtained.

As used herein, the "vinyl-based aromatic hydrocarbon" means an aromatic hydrocarbon compound having a vinyl group, and specific examples thereof include styrene, o-methylstyrene, p-methylstyrene, p-tert-butylstyrene, 1,3-dimethylstyrene, α-methylstyrene, vinylnaphthalene, vinylanthracene and the like. Styrene is particularly preferable. These vinyl-based aromatic hydrocarbons can be used alone, or in combination.

The "conjugated diene compound" means a diolefin compound having at least one pair of conjugated double bonds. Specific examples of the "conjugated diene compound" include 1,3-butadiene, 2-methyl-1,3-butadiene (or isoprene), 2,3-dimethyl-1,3-butadiene, 1,3-pentadiene and 1,3-hexadiene. Among these conjugated diene compounds, 1,3-butadiene and 2-methyl-1,3-butadiene are particularly preferable. These conjugated diene compounds can be used alone, or in combination.

The thermoplastic block copolymer (A) according to the present invention may be either an unhydrogenated block copolymer, or a hydrogenated block copolymer thereof, or a combination thereof.

Specific examples of the "unhydrogenated thermoplastic block copolymer" include block copolymers in which blocks based on the conjugated diene compound are not hydrogenated. Specific examples of the "hydrogenated block copolymer" include block copolymers in which blocks based on the conjugated diene compound are entirely or partially hydrogenated.

A proportion that the "thermoplastic block copolymer (A)" is hydrogenated can be indicated by a "hydrogenation ratio". The "hydrogenation ratio" of the "thermoplastic block copolymer (A)" refers to a proportion of double bonds converted into saturated hydrocarbon bonds by hydrogenation on the basis of all aliphatic double bonds included in the blocks based on the conjugated diene compound. The "hydrogenation ratio" can be measured by an infrared spectrophotometer, a nuclear magnetic resonance spectrometer and the like.

A proportion that the "hydrogenated block copolymer" is hydrogenated can be indicated by a "hydrogenation ratio" in the same manner.

Specific examples of the "unhydrogenated thermoplastic block copolymer" include a styrene-isoprene block copolymer (also referred to as "SIS") and a styrene-butadiene block copolymer (also referred to as "SBS"). Specific examples of the "hydrogenated thermoplastic block copolymer" include a hydrogenated styrene-isoprene block copolymer (also referred to as "SEPS") and a hydrogenated styrene-butadiene block copolymer (also referred to as "SEBS").

Both unhydrogenated block copolymers and hydrogenated block copolymers can be used alone, or in combination.

These thermoplastic block copolymers (A) can also be used alone, or in combination.

It is possible to use, as the thermoplastic block copolymer (A), commercially available products.

Examples thereof include Asaprene T439 (trade name), Asaprene T436 (trade name), Asaprene T438 (trade name), Asaprene N505 (trade name), TAFTEC H1121 (trade name), TAFTEC H1062 (trade name), TAFTEC H1052X (trade name) and TUFPREN T125 (trade name) manufactured by Asahi Kasei Chemicals Corporation;

TR2003 (trade name), TR2500 (trade name) and TR2600 (trade name) manufactured by JSR Corporation;

Stereon 857 (trade name) and Stereon 841A (trade name) manufactured by Firestone;

Kraton D1118 (trade name), Kraton G1654 (trade name) and Kraton G1726 (trade name) manufactured by Kraton Polymers; Sol T166 (trade name) manufactured by Enichem;

Quintac 3433N (trade name) and Quintac 3421 (trade name) manufactured by Zeon Corporation; and SEPTON 2002 and SEPTON 2063 (trade name) manufactured by Kuraray Co., Ltd.

These commercially available products of the thermoplastic block copolymer (A) can be respectively used alone, or in combination.

The styrene content of the thermoplastic block copolymer (A) is preferably 20% by weight or less, and particularly preferably from 10 to 15% by weight. The styrene content refers to the proportion of styrene blocks included in the (A). When the styrene content is 20% by weight or less, compatibility of the component (A) with the component (B) and the component (C) is improved, and thus the adhesive strength to a nonwoven fabric and a polyolefin film (preferably a polyethylene film) of the obtained hot melt adhesive is more improved.

In the present invention, the propylene homopolymer (B) refers to a homopolymer of propylene, which is produced by using a metallocene catalyst as a polymerization catalyst. The melting point of the propylene homopolymer (B) is 100° C. or lower, more preferably from 60 to 90° C., and most preferably from 65 to 85° C.

The melting point refers to a value measured by differential scanning calorimetry (DSC). Specifically, after weighing 10 mg of a sample in an aluminum container, the measurement is carried out at temperature rise rate of 5° C./minute using DSC6220 (trade name) manufactured by SII NanoTechnology Inc, and a temperature of a fusion peak top refers to the melting point.

When propylene is polymerized using a metallocene catalyst, a propylene homopolymer having (i) crystallinity and (ii) very narrow molecular weight distribution is synthesized.

The (i) means that complete isotacticity and syndiotacticity can be optionally controlled. Therefore, a polymer, in which arrangement, ratio and the like of methyl groups are uniform, is obtained without causing deviation of the crystallinity, and a low crystalline site that can cause decrease in adhesive force is less likely to be formed.

With respect to the (ii), when molecular weight distribution of the propylene homopolymer (B) is indicated by polydispersity (Mw/Mn), it is from 1 to 3. The propylene homopolymer having polydispersity of from 1 to 3 is excellent in spiral coatability. The molecular weight distribution is a concept which indicates distribution of a molecular weight of a synthetic polymer, and a ratio (Mw/Mn) of a weight average molecular weight (Mw) to a number average molecular weight (Mn) serves as an indicator. In the present invention, the molecular weight distribution is measured by gel permeation chromatography (GPC).

Examples of the propylene homopolymer (B) include: (B1) a propylene homopolymer having a weight average molecular weight of 60,000 or less; and (B2) a propylene homopolymer having a weight average molecular weight of more than 60,000.

The weight average molecular weight of the propylene homopolymer (B1) is 60,000 or less, preferably from 30,000 to 60,000, and more preferably from 35,000 to 55,000.

The weight average molecular weight of the propylene homopolymer (B2) is more than 60,000, preferably more than 60,000 and 90,000 or less, and more preferably more than 60,000 and 80,000 or less.

The weight average molecular weight (Mw) means a value measured by gel permeation chromatography (GPC), followed by conversion. Specifically, the weight average molecular weight can be obtained by measuring a value using the following apparatus and measuring method, followed by conversion. RI manufactured by Wators Corporation is used as a detector. TSKGEL GMHHR-H(S) HT manufactured by TOSOH CORPORATION is used as a GPC column. A sample is dissolved in 1,2,4-trichlorobenzene and allowed to flow at a flow rate of 1.0 ml/min and a measuring temperature of 145° C. to obtain a measured value of the molecular weight. The objective weight average molecular weight is obtained by conversion of the measured molecular weight using a calibration curve derived based on polypropylene.

Since the number average molecular weight (Mn) is also determined by the same method, the molecular weight distribution is also calculated by GPC.

Examples of a commercially available product of the propylene homopolymer (B1) include L-MODU S400S (trade name) manufactured by Idemitsu Kosan Co., Ltd., and examples of a commercially available product of the propylene homopolymer (B2) include L-MODU S600S (trade name) manufactured by Idemitsu Kosan Co., Ltd.

In the present invention, the ethylene/α-olefin copolymer (C) is a copolymer of ethylene with α-olefin, and is preferably obtainable by polymerizing using a metallocene catalyst.

The hot melt adhesive according to the present invention contains the ethylene/α-olefin copolymer (C), spiral coatability at low temperature is improved, and also adhesion to a polyethylene film or a nonwoven fabric is excellent.

Polydispersity (Mw/Mn) of the ethylene/α-olefin copolymer (C) obtained by polymerizing a metallocene catalyst is narrow, similar to that of the (B). The polydispersity of the copolymer (C) obtained by polymerizing using a metallocene catalyst is preferably from 1 to 4, more preferably from 1 to 3, and particularly preferably from 1.5 to 3.

Examples of the ethylene/α-olefin copolymer (C) include an ethylene/propylene copolymer, an ethylene/1-octene copolymer, an ethylene/1-butene copolymer and an ethylene/propylene/1-butene copolymer, and the ethylene/propylene copolymer and the ethylene/1-octene copolymer are particularly preferable.

When the hot melt adhesive according to the present invention contains at least one selected from the ethylene/propylene copolymer and the ethylene/1-octene copolymer, spiral coatability at low temperature is more improved.

The ethylene/α-olefin copolymer preferably exhibits a melt index at 230° C. of 200 g/10 min or less, more preferably from 10 to 50 g/10 min, and most preferably from 20 to 30 g/10 min. When the melt index is within the above range, the peel strength of the hot melt adhesive is improved.

As used herein, the melt index means an index which indicates fluidity of a resin, and is indicated by the amount of a synthetic resin extruded through an opening (nozzle), provided on a bottom of a cylindrical vessel heated with a heater, per 10 minutes by pressurizing a given amount of the resin in the vessel after heating at a predetermined temperature (for example, 230° C.) under a predetermined load (for example, 2.16 kg). A unit: g/10 min is used. The melt index is measured by the measurement procedure defined in ASTM D1238.

The hot melt adhesive containing the ethylene/1-octene copolymer can improve appearance of disposable products since a coating pattern is inconspicuous even when an adherend such as a polyethylene film or a nonwoven fabric is spiral coated with the hot melt adhesive.

It is preferred that the hot melt adhesive according to the present invention further includes: (D) a tackifier resin.

Examples of the tackifier resin (D) include a natural rosin, a modified rosin, a hydrogenated rosin, a glycerol ester of a natural rosin, a glycerol ester of a modified rosin, a pentaerythritol ester of a natural rosin, a pentaerythritol ester of a modified rosin, a pentaerythritol ester of a hydrogenated rosin, a copolymer of a natural terpene, a terpolymer of a natural terpene, hydrogenated derivatives of a copolymer of a hydrogenated terpene, a polyterpene resin, hydrogenated derivatives of a phenol-based modified terpene resin, an aliphatic petroleum hydrocarbon resin, hydrogenated derivatives of an aliphatic petroleum hydrocarbon resin, an aromatic petroleum hydrocarbon resin, hydrogenated derivatives of an aromatic petroleum hydrocarbon resin, a cyclic aliphatic petroleum hydrocarbon resin, and hydrogenated derivatives of a cyclic aliphatic petroleum hydrocarbon resin. These tackifier resins can be used alone, or in combination.

It is also possible to use, as the tackifier resin, a liquid type tackifier resin as long as it has a colorless to pale yellow color tone and has substantially no odor, and also has satisfactory thermal stability. Taking these characteristics into consideration comprehensively, the tackifier resin is preferably hydrogenated derivatives of resins, and particularly preferably a hydrogenated dicyclopentadiene-based resin.

It is possible to use, as the tackifier resin (D), commercially available products. Examples of these commercially available products include Alcon P100 (trade name) and Alcon M100 (trade name) manufactured by Arakawa Chemical Industries, Ltd.; Clearon M105 (trade name) manufactured by YASUHARA CHEMICAL CO., LTD.; ECR5400 (trade name) and ECR179EX (trade name) manufactured by Exxon Corporation; and Quinton DX395 (trade name) and Quinton DX390N (trade name) manufactured by Zeon Corporation. These commercially available tackifier resins can be used alone, or in combination.

The hot melt adhesive according to the present invention can further include: (E) a plasticizer. The plasticizer (E) is blended for the purpose of decreasing melt viscosity of the hot melt adhesive, imparting flexibility to the hot melt adhesive and improving wettability of the hot melt adhesive to an adherend. There is no particular limitation as long as the plasticizer is compatible with the block copolymer and the objective hot melt adhesive according to the present invention can be obtained. Examples of the plasticizer (E) include paraffin oil, naphthene oil and aromatic oil. Colorless and odorless oils such as naphthene oil and paraffin oil are particularly preferable.

It is possible to use, as the plasticizer (E), commercially available products. Examples thereof include White Oil Broom 350 (trade name) manufactured by Kukdong Oil & Chemical Co., Ltd.; Diana Fresia S32 (trade name), Diana Process Oil PW-90 (trade name), DN oil KP-68 (trade name) and Process Oil NS100 (trade name) which are manufactured by Idemitsu Kosan Co., Ltd.; KN4010 (trade name) manufactured by PetroChina Company; Enerper M1930 (trade name) manufactured by BP Chemicals Ltd.; Kaydol (trade name) manufactured by Crompton Corporation; and Primol 352 (trade name) manufactured by Esso Corp. These plasticizers (E) can be used alone, or in combination.

The hot melt adhesive according to the present invention may contain: (F) a wax. As used herein, the "wax" refers to an organic substance having a weight average molecular weight of less than 10,000, which is solid at normal temperature and becomes liquid when heated, and is commonly considered as a "wax". There is no particularly limitation on the wax as long as the hot melt adhesive according to the present invention can be obtained, if it has wax-like properties.

The wax (F) preferably contains: (F1) an olefin wax modified with carboxylic acid or carboxylic anhydride.

In the present invention, the "(F1) olefin wax modified with carboxylic acid or carboxylic anhydride" refers to an olefin wax which is chemically or physically processed with carboxylic acid or carboxylic anhydride, and there is no particular limitation as long as the objective hot melt adhesive according to the present invention is obtainable. Examples of chemical or physical processing include oxidation, polymerization, blending, synthesis and the like.

Examples of the wax (F1) include a wax which is obtainable by graft polymerization of carboxylic acid or carboxylic anhydride with an olefin wax; and a wax which is obtainable by copolymerization of carboxylic acid or carboxylic anhydride on synthesizing an olefin wax by polymerization.

Therefore, the wax may be an olefin wax which is modified as a result of introduction of carboxylic acid or carboxylic anhydride into the "olefin wax" using various reactions.

There is no particular limitation on the "carboxylic acid" and/or the "carboxylic anhydride" to be used to modify the olefin wax as long as the objective hot melt adhesive according to the present invention is obtainable.

Specific examples of the carboxylic acid or carboxylic anhydride include maleic acid, maleic anhydride, fumaric acid, fumaric anhydride, itaconic acid, acrylic acid, methacrylic acid and the like. These carboxylic acids and/or carboxylic anhydrides may be used alone, or in combination. Maleic acid and maleic anhydride are preferable, and maleic anhydride is particularly preferable.

In the hot melt adhesive according to the present invention, the blending amount of the thermoplastic block copolymer (A) is preferably from 1 to 9 parts by weight, and more preferably from 2 to 6 parts by weight, based on 100 parts by weight of the total weight of the components (A) to (C) and optionally containable components (D) to (F). When the blending amount of the thermoplastic block copolymer (A) is from 1 to 9 parts by weight, the hot melt adhesive is more excellent in balance of high-speed coating and spiral coating at low temperature, adhesion to a polyolefin film (preferably polyethylene film) and a nonwoven fabric, and an open time.

The blending amount of the propylene homopolymer (B) is preferably from 20 to 40 parts by weight, more preferably from 25 to 40 parts by weight, and preferably from 25 to 35 parts by weight, based on 100 parts by weight of the total weight of the components (A) to (C) and optionally containable components (D) to (F). When the blending amount of the propylene homopolymer (B) is from 20 to 40 parts by weight, the hot melt adhesive is more excellent in spiral coatability at low temperature while maintaining the adhesive force to a polyolefin film (preferably polyethylene film) and a nonwoven fabric.

The blending amount of the ethylene/α-olefin copolymer (C) is preferably from 1 to 8 parts by weight, and more preferably from 1.5 to 5 parts by weight, based on 100 parts by weight of the total weight of the components (A) to (C) and optionally containable components (D) to (F). When the blending amount of the ethylene/α-olefin copolymer (C) is from 1.5 to 5 parts by weight, the hot melt adhesive is more excellent in adhesion to a polyolefin film or a nonwoven fabric while maintaining excellent spiral coatability or high-speed coatability.

If necessary, the hot melt adhesive according to the present invention may further contain various additives. Examples of the various additives include a stabilizing agent and a fine particle filler.

The "stabilizing agent" is blended so as to prevent decrease in molecular weight, occurrence of gelation, coloration, odor and the like of the hot melt adhesive due to heat, thereby improving stability of the hot melt adhesive, and there is no particular limitation as long as the objective hot melt adhesive according to the present invention is obtainable. Examples of the "stabilizing agent" include an antioxidant and an ultraviolet absorber.

The "ultraviolet absorber" is used so as to improve light resistance of the hot melt adhesive. The "antioxidant" is used so as to prevent oxidative degradation of the hot melt adhesive. There is no particular limitation on the antioxidant and the ultraviolet absorber, as long as they are commonly used in disposable products and the below-mentioned objective disposable products are obtainable.

Examples of the antioxidant include a phenol-based antioxidant, a sulfur-based antioxidant and a phosphorus-based antioxidant. Examples of the ultraviolet absorber include a benzotriazole-based ultraviolet absorber and a benzophenone-based ultraviolet absorber. It is also possible to add a lactone-based stabilizer. These additives can be used alone, or in combination.

It is possible to use, as the stabilizer, commercially available products. Examples thereof include SUMILIZER GM (trade name), SUMILIZER TPD (trade name) and SUMILIZER TPS (trade name) manufactured by Sumitomo Chemical Co. Ltd.; IRGANOX 1010 (trade name), IRGANOX HP2225FF (trade name), IRGAFOS 168 (trade name) and IRGANOX 1520 (trade name) manufactured by Ciba Specialty Chemicals Inc.; and JF77 (trade name) manufactured by Johoku Chemical Co., Ltd. These stabilizers can be used alone, or in combination.

The hot melt adhesive for disposable products according to the present invention can further include a fine particle filler. The fine particle filler may be commonly used fine particle filler, and there is no particular limitation as long as the objective hot melt adhesive according to the present invention can be obtained. Examples of the "fine particle filler" include mica, calcium carbonate, kaolin, talc, titanium oxide, diatomaceous earth, urea-based resin, styrene beads, calcined clay, starch and the like. These particles preferably have a spherical shape, and there is no particular limitation on the size (diameter in the case of a spherical shape).

The hot melt adhesive for disposable products according to the present invention can be produced by blending the components (A) to (C), optionally blending the components (D) to (F), if necessary blending the various additives, and melting the mixture with heating, followed by mixing.

The blending amount of the thermoplastic block copolymer (A) is preferably from 1.0 to 9.0 parts by weight, and the blending amount of the ethylene/α-olefin copolymer (C) is preferably from 1.0 to 8.0 parts by weight, and particularly preferably from 1.5 to 5.0 parts by weight, based on 100 parts by weight of the total weight of the hot melt adhesive. When the blending ratios of the thermoplastic block copolymer (A) and the ethylene/α-olefin copolymer (C) are within the above ranges, the hot melt adhesive according to the present invention is excellent in high-speed coating and spiral coating at low temperature and is also excellent in adhesion to a polyolefin film (preferably, polyethylene film) and a nonwoven fabric. Because of low solidification rate, the hot melt adhesive can also cope with the production line for disposable products which needs a long open time, leading to a hot melt adhesive suited for use in disposable products.

The hot melt adhesive according to the present invention can be specifically produced by charging the above components in a melt-mixing vessel equipped with a stirrer, followed by mixing with heating.

With regard to the hot melt adhesive according to the present invention, a melt viscosity at 140° C. is preferably 8,000 mPa·s or less, more preferably from 2,000 to 7,000 mPa·s, and particularly preferably from 2,000 to 6,000 mPa·s. The "melt viscosity" is a viscosity of a melt of the hot melt adhesive and is measured by a Brookfield RVT-type viscometer (spindle No. 27).

By controlling the melt viscosity within the above range, the hot melt adhesive is suitable for low-temperature coating. Furthermore, the hot melt adhesive is uniformly applied to a nonwoven fabric and is likely to penetrate, and thus the adhesive is more suitable for use in disposable products.

As mentioned above, the hot melt adhesive according to the present invention can also be employed in paper processing, bookbinding, disposable products and the like, and it is suitably used in disposable products since it is excellent in adhesion to a nonwoven fabric and a polyolefin film (preferably a polyethylene film).

The disposable products can be constituted by coating at least one kind of a member selected from a group consisting of a woven fabric, a nonwoven fabric, a rubber, a resin, papers and a polyolefin film with the hot melt adhesive according to the present invention. The polyolefin film is preferably a polyethylene film for the reason of durability, costs and the like.

There is no particular limitation on the disposable products as long as they are so-called sanitary materials. Specific examples thereof include a paper diaper, a sanitary napkin, a pet sheet, a hospital gown, a surgical white garment and the like.

In the production line for the disposable products, various members (for example, tissue, cotton, nonwoven fabric, polyolefin film, etc.) of the disposable products are commonly coated with the hot melt adhesive. In case of coating, the hot melt adhesive may be discharged from various ejectors.

There is no particular limitation on the method of coating with the hot melt adhesive as long as the objective disposable products can be obtained. Such a coating method is roughly classified into a contact coating method and a non-contact coating method. The "contact coating" method refers to a coating method in which a discharger is brought into contact with a member or a film in the case of coating with the hot melt adhesive, while the "non-contact coating" method refers to a coating method in which a discharger is not brought into contact with a member or a film in the case of coating with the hot melt adhesive. Examples of the contact coating method include a slot coater coating method, a roll coater coating method and the like, and examples of the non-contact coating method include a spiral coating capable of coating in a spiral form, an omega coating or control seam coating method capable of coating in a wavy form, a slot spray coating or curtain spray coating method capable of coating in a plane form, and dot coating capable of coating in a dot form.

The hot melt adhesive according to the present invention is suitable for spiral coating. The spiral coating method is a method in which an adhesive is applied by intermittent or continuous application, wherein the adhesive is applied in a spiral form using air without contact.

It is extremely useful for the production of the disposable products that the hot melt adhesive can be applied in a wide width (breadth) by the spray coating. The hot melt adhesive capable of being applied in a wide width is capable of decreasing the coating width by adjusting the pressure of the hot air.

When it is difficult to apply the hot melt adhesive in a wide width, a lot of spray nozzles for obtaining sufficient bonding area are required, and thus it is unsuitable for the production of comparatively small disposable products such as a urine collection liner, and disposable products having a complicated shape.

Therefore, the hot melt adhesive according to the present invention is suitable for the disposable products since the spiral coating can be performed in a wide width.

The hot melt adhesive according to the present invention is useful for the production of the disposable products because of satisfactory coatability at about 140° C. In case of coating with the hot melt adhesive at a high temperature, since a polyolefin film (preferably a polyethylene film) as a base material of the disposable products is melted and thermally shrinks, appearance of the disposable products is drastically impaired. In case of applying the hot melt adhesive at about 140° C., appearance of a nonwoven fabric and a polyolefin film (preferably a polyethylene film) as a base material of the disposable products scarcely changes and thus the appearance of the product is not impaired.

The hot melt adhesive according to the present invention is also suitable for the production of the disposable products in a short time since it is excellent in high-speed coatability. When the base material transported at a high speed is coated with the hot melt adhesive, breakage of the base material due to friction may arise in the contact type coating method. The hot melt adhesive according to the present invention is suitable for the spiral coating as a kind of non-contact coating and is therefore suited for high-speed coating, and thus it is possible to improve the production efficiency of the disposable products. Furthermore, the hot melt adhesive according to the present invention suited for high-speed coating hardly cause disorder of the coating pattern.

The hot melt adhesive according to the present invention has satisfactory thermal stability and is uniformly melted in a high-temperature tank at 100 to 200° C. and does not cause phase separation. A hot melt adhesive having poor thermal stability easily cause phase separation of components in the high-temperature tank. The phase separation can cause clogging of a tank filter and a transfer piping.

Main embodiments of the present invention are shown below.

1. A hot melt adhesive including: (A) a thermoplastic block copolymer which is a copolymer of a vinyl-based aromatic hydrocarbon with a conjugated diene compound; (B) a propylene homopolymer having a melting point of 100° C. or lower which is obtainable by polymerizing propylene using a metallocene catalyst; and (C) an ethylene/α-olefin copolymer.

2. The hot melt adhesive according to the above 1, wherein the thermoplastic block copolymer (A) contains at least, one selected from: (A1) a hydrogenated styrene-butadiene block copolymer (SEBS); and (A2) a hydrogenated styrene-isoprene block copolymer (SEPS).

3. The hot melt adhesive according to the above 1 or 2, wherein the ethylene/α-olefin copolymer (C) contains at least one selected from an ethylene/propylene copolymer and an ethylene/1-octene copolymer.

4. The hot melt adhesive according to any one of the above 1 to 3, further including: at least one selected from (D) a tackifier resin and (E) a plasticizer, wherein the plasticizer (E) contains at least one selected from (E1) a naphthene oil and (E2) a paraffin oil.

5. The hot melt adhesive according to any one of the above 1 to 4, which contains the thermoplastic block copolymer (A) in the amount of 1.0 to 9.0 parts by weight of and the ethylene/α-olefin copolymer (C) in the amount of 1.0 to 8.0 parts by weight, based on 100 parts by weight of the total weight of the entire adhesive.

6. Disposable products obtainable by using the hot melt adhesive according to any one of the above 1 to 5.

EXAMPLES

The present invention will be described for the purpose of describing the present invention in more detail and specific manner by way of Examples. These are exemplary of the present invention and are not to be considered as limiting.

Components for blending hot melt adhesives are shown below.

(A)Thermoplastic block copolymer (A1) SEBS (having a styrene content of 12% by weight, manufactured by Asahi Kasei Chemicals Corporation under the trade name of TAFTEC H1221)

(A2) SEPS (having a styrene content of 13% by weight, manufactured by Kuraray Co., Ltd. under the trade name of SEPTON 2603)

(A3) SBS (having a styrene content of 40% by weight, manufactured by Asahi Kasei Chemicals Corporation under the trade name of Asaprene T439)

(B) Propylene homopolymer having a melting point 100° C. or lower which is obtained by polymerization using a metallocene catalyst (B1) Crystalline propylene homopolymer having a melting point of 75° C. and a weight average molecular weight of 45,000, polydispersity of 2.0 (manufactured by Idemitsu Kosan Co., Ltd. under the trade name of "L-MODU S400")

(B2) Crystalline propylene homopolymer having a melting point of 80° C. and a weight average molecular weight of 70,000, polydispersity of 2.0 (manufactured by Idemitsu Kosan Co., Ltd. under the trade name of "L-MODU S600")

(B'3) Crystalline propylene homopolymer having a melting point of 145° C., polydispersity of 1.9 (manufactured by Clariant K.K. under the trade name of Licocene PP6102)

(C) Ethylene/α-olefin copolymer (C1) Propylene/ethylene copolymer which is obtained by polymerization using a metallocene catalyst (manufactured by Exxon Mobil Corporation under the trade name of Vistamaxx 6202)

(C2) Ethylene/1-octene copolymer which is obtained by polymerization using a metallocene catalyst (manufactured by The Dow Chemical Company under the trade name of INFUSE 9807)

(C3) Ethylene/propylene copolymer which is obtained by polymerization using a metallocene catalyst (manufactured by Clariant (Japan) K.K. under the trade name of Licocene PP2602)

(C4) Ethylene/1-octene copolymer which is obtained by polymerization using a metallocene catalyst (manufactured by The Dow Chemical Company under the trade name of AFFINITY GA1950)

(C5) Amorphous ethylene/propylene copolymer (manufactured by Huntsman Corporation under the trade name of Rexentac 2304)

(D) Tackifier resin (D1) Hydrogenated tackifier resin (manufactured by Exxon Mobil Corporation under the trade name of ECR5400)

(D2) Hydrogenated tackifier resin (manufactured by Exxon Mobil Corporation under the trade name of ECR179X)

(D3) Unhydrogenated tackifier resin (manufactured by Zeon Corporation under the trade name of Quintone DX395)

(D4) Hydrogenated tackifier resin (manufactured by Arakawa Chemical Industries, Ltd. under the trade name of AlconM100)

(D5) Hydrogenated Liquid tackifier resin (manufactured by Maruzen Petrochemicals Co., Ltd. under the trade name of Maruca Clear-H)

(E) Plasticizer (E1) Naphthene oil (manufactured by Idemitsu Kosan Co., Ltd. under the trade name of Process oil NS100)

(E2) Naphthene oil (manufactured by PetroChina Company under the trade name of KN4010)

(E3) Paraffin oil (manufactured by Idemitsu Kosan Co., Ltd. under the trade name of Diana Process Oil PW90)

(F) Wax (F1) Maleic acid-modified wax (manufactured by Clariant K.K. under the trade name of Licocene PP MA6252)

(G) Additive (G1) Antioxidant (manufactured by ADEKA Corporation under the trade name of Adekastab AO60)

These components were blended according to the formulations shown in Tables 1 and 2, and then melt-mixed at about 150° C. over 3 hours using a universal stirrer to prepare hot melt adhesives of Examples 1 to 6 and Comparative Examples 1 to 9.

With respect to the above each hot melt adhesives, melt viscosity, peel strength, solidification rate, and coatability were evaluated. Summary of the each of the evaluations is shown below.

<Melt Viscosity (mPa·s, coatability)>

A hot melt adhesive was melted at 140° C. and 160° C. and, after 20 minutes, viscosity was measured by a No. 27 rotor using a Brookfield viscometer. The evaluation criteria are as follows.

Melt Viscosity at 140° C.
A: 2,000 mPa·s to 6,000 mPa·s
B: 1,000 mPa·s or more and less than 2,000 mPa·s, or more than 6,000 mPa·s and less than 10,000 mPa·s
D: less than 1,000 mPa·s or 10,000 mPa·s or more Melt Viscosity at 160° C.
A: 500 mPa·s to 3,000 mP·s
B: more than 3,000 mPa·s and 7,000 mPa·s or less
D: less than 500 mPa·s or more than 7,000 mPa·s <Peel Strength Test>

(Production of Samples)

A nonwoven fabric was coated with a hot melt adhesive in a coating amount of 5 g/m². Using a slot coater, coating was carried out at a temperature of 140° C. The nonwoven fabric coated with the hot melt adhesive was laid on another nonwoven fabric through the hot melt adhesive, followed by pressing under a pressure of 0.5 kgf/cm to obtain a sample (nonwoven fabric/nonwoven fabric).

Furthermore, a nonwoven fabric coated with a hot melt adhesive was laid on a polyethylene (PE) film through the hot melt adhesive, followed by pressing under a pressure of 0.5 kgf/cm to obtain another sample (nonwoven fabric/PE film).

(Test Procedure)

Both the nonwoven fabric/nonwoven fabric sample and the nonwoven fabric/PE film sample were cut into a width of 25 mm in a direction (CD direction) vertical to the direction of movement of the base material, and then peel strength was measured by T type peeling using a universal tensile testing machine (manufactured by JT Toshi Inc.). With regard to each test, 3 samples were prepared and average peel strength was determined. The measurement was performed by the universal tensile testing machine under an environment of 20° C., 65% Rh and a peeling rate of 300 mm/minute.

Peel Strength between Nonwoven Fabric and PE Film
A: Average peel strength is more than 200 (g/25 mm).
B: Average peel strength is from 150 to 200 (g/25 mm).
D: Average peel strength between PE film and nonwoven fabric is less than 150 (g/25 mm).

Peel Strength between Nonwoven Fabric and Nonwoven Fabric
A: Material (base material) fracture occurs, or average peel strength is more than 200 (g/25 mm).
B: Average peel strength is from 150 to 200 (g/25 mm)
D: Average peel strength is less than 150 (g/25 mm).

"Material fracture" means that a nonwoven fabric or a PE film as a base material underwent fracture in the case of peeling a sample, and is also expressed as "MF".

<Solidification Rate>

(Production of Samples)

Two polyethylene terephthalate (PET) films were bonded by the hot melt adhesive according to the present invention to produce a laminated sheet (sample). A coating thickness of the hot melt adhesive is 50 μm.

The sample was cut into pieces of 25 mm in width, and was provided with handles of about 3 cm in size, so as to enable T peeling. A graded scale was put on the position which is 3 cm away from the end, and then the sample was heated in a dryer at 100° C. for 10 minutes.

(T-Peel Test)

After completion of heating, the sample was taken out. One handle was fixed and a load of 500 g was suspended on the other one handle, and then a T-peel test was performed. The time required for peeling of the film to reach 3 cm was measured. Evaluation criteria of a solidification rate is as follows.

A: Time required for peeling to reach 3 cm is within 3 minutes.
D: Time required for peeling to reach 3 cm is longer than 3 minutes.

<Coatability>

Using a spiral spray manufactured by Nordson Corporation, a coating base material was coated with a hot melt adhesive while adjusting an air pressure to produce a laminate of the coated coating base material and a laminating base material, and coatability was evaluated. Both the coating base material and the laminating base material are polyethylene terephthalate (PET) films.

More specifically, after setting at a temperature (i.e. coating temperature) at which melt viscosity of the hot melt adhesive becomes 5,000 mPa·s, the spiral spray (manufactured by Nordson Corporation) was mounted at a position (height of 30 mm from a PET film) and then the PET film as a coating base material was coated with the hot melt adhesive at an open time of 0.5 seconds in a coating weight of 15 g/m² while appropriately adjusting an air pressure, and the coated PET film was laid on a PET film as a laminating base material to produce a laminate (PET film/PET film), and then coatability was evaluated.

Spiral coatability was evaluated by confirming a coating width of the hot melt adhesive applied by the spiral coating. High-speed line coatability was evaluated by confirming a situation of scattering of the hot melt adhesive applied by the spiral coating. Evaluation criteria are shown below.

Spiral Coatability

The coatability on the spiral coating (or spiral coatability) was evaluated by a balance between the air pressure of the spiral spray and the spiral width of the applied hot melt adhesive.

A: Spiral width of 15 mm was possible under the air pressure of 0.40 kgf/cm² or less.
B: Spiral width of 15 mm was possible under the air pressure of more than 0.40 kgf/cm² and 0.45 kgf/cm² or less.
D: Spiral width of 15 mm was impossible even by controlling the air pressure.

High-Speed Coatability

Furthermore, the high-speed line coatability was evaluated by the air pressure of the spiral spray and the situation of scattering of the applied hot melt adhesive.

A: Hot melt adhesive did not cause scattering under the air pressure of 0.55 kgf/cm².
B: Hot melt adhesive did not cause scattering under the air pressure of 0.50 kgf/cm².
D: Hot melt adhesive caused scattering under the air pressure of 0.40 kgf/cm² or less.

TABLE 1

| Examples | | 1 | 2 | 3 | 4 | 5 | 6 |
|---|---|---|---|---|---|---|---|
| (A) | (A1) | 5 | 3 | | 3 | 5 | 5 |
|  | (A2) |  |  | 7 |  |  |  |
| (B) | (B1) | 28 | 23 | 30 | 28 | 29 | 27 |
|  | (B2) |  | 5 |  |  |  |  |
| (C) | (C1) | 5 |  | 3 | 5 | 3 | 4 |
|  | (C2) |  | 7 |  |  |  |  |
| (D) | (D1) | 37 | 37 | 37 |  | 37 |  |
|  | (D2) |  |  |  | 22 |  | 22 |
|  | (D3) |  |  |  | 15 |  | 15 |
| (E) | (E1) | 25 |  | 13 | 27 |  |  |
|  | (E2) |  |  |  |  | 25 | 26 |
|  | (E3) |  | 25 | 10 |  |  |  |
| (F) | (F1) |  |  |  |  | 1 | 1 |
| (G) | (G1) | 0.5 | 0.5 | 0.5 | 0.5 | 0.5 | 0.5 |
| Total |  | 100.5 | 100.5 | 100.5 | 100.5 | 100.5 | 100.5 |
| Viscosity (mPa·s) | 140° C. | 6,550 | 7,125 | 7,338 | 5,200 | 5,480 | 5,800 |
|  |  | A | B | B | A | A | A |
|  | 160° C. | 3,310 | 3,788 | 3,850 | 2,675 | 2,730 | 2,950 |
|  |  | B | B | B | A | A | A |
| Peel strength (g/25 mm) | PE film/Nonwoven fabric | 242 | 205 | 253 | 235 | 215 | 250 |
|  |  | A | A | A | A | A | A |
|  | Nonwoven fabric/Nonwoven fabric | MF | MF | MF | MF | MF | MF |
|  |  | A | A | A | A | A | A |
| Solidification rate | Time (seconds) | 55 | 93 | 23 | 20 | 147 | 135 |
|  |  | A | A | A | A | A | A |
| Coatability | Spiral coating air pressure | 0.44 | 0.46 | 0.39 | 0.44 | 0.39 | 0.4 |
|  | Coating temperature | 147 | 152 | 153 | 141 | 143 | 144 |
|  |  | B | C | A | B | A | A |
|  | High-speed coating air pressure | 0.75 | 0.8 | 0.65 | 0.7 | 0.6 | 0.65 |
|  | Coating temperature | 147 | 152 | 153 | 141 | 143 | 144 |
|  |  | A | A | A | A | A | A |

TABLE 2

| Comparative Examples | | 1 | 2 | 3 | 4 | 5 |
|---|---|---|---|---|---|---|
| (A) | (A1) | | | | 5 | 10 |
| | (A2) | | | | | |
| | (A3) | | | | | |
| (B) | (B1) | 45 | | | 28 | 28 |
| | (B2) | | 35 | | | |
| | (B'3) | | | 25 | | |
| (C) | (C1) | | | 5 | 10 | |
| | (C2) | | | | | |
| | (C3) | | | | | |
| | (C4) | | | | | |
| | (C5) | | | | | |
| (D) | (D1) | 40 | 40 | 40 | 40 | 40 |
| | (D2) | | | | | |
| | (D4) | | | | | |
| | (D5) | | | | | |
| (E) | (E1) | 15 | | 25 | 22 | 22 |
| | (E3) | | 25 | | | |
| (G) | (G1) | 0.5 | 0.5 | 0.5 | 0.5 | 0.5 |
| Total. | | 100.5 | 100.5 | 100.5 | 100.5 | 100.5 |
| Viscosity (mPa·s) | 140° C. | 4,200 A | 7,300 B | 990 D | 9,650 B | 6,600 B |
| | 160° C. | 2,100 A | 3,700 B | 530 D | 4,863 B | 3,200 B |
| Peel strength (g/25 mm) | PE film/ Nonwoven fabric | 37 D | 107 D | 50 D | 237 A | 235 A |
| | Nonwoven fabric/ Nonwoven fabric | 158 B | MF A | MF A | MF A | MF A |
| Solidification rate | Time (seconds) | 91 A | 70 A | 300 or more D | 43 A | 260 D |
| Coatability | Spiral coating air pressure | 0.35 | 0.34 | — | — | 0.36 |
| | Coating temperature | 145 A | 158 A | 125 D | 158 D | 147 A |
| | High-speed coating air pressure | 0.5 | 0.55 | — | 1.2 | 0.55 |
| | Coating temperature | 145 B | 158 A | 125 D | 158 A | 147 A |

| Comparative Examples | | 6 | 7 | 8 | 9 |
|---|---|---|---|---|---|
| (A) | (A1) | | | | 10 |
| | (A2) | 10 | 20 | | |
| | (A3) | | | 25 | |
| (B) | (B1) | | | | |
| | (B2) | | | | |
| | (B'3) | | | | |
| (C) | (C1) | | | | |
| | (C2) | | | | |
| | (C3) | 10 | 30 | | |
| | (C4) | | | | 25 |
| | (C5) | 30 | | | |
| (D) | (D1) | | | | 40 |
| | (D2) | | | 55 | |
| | (D4) | 43 | 43 | | |
| | (D5) | 7 | 7 | | |
| (E) | (E1) | | | | 25 |
| | (E3) | | | 20 | |
| (G) | (G1) | 0.5 | 0.5 | 0.5 | 0.5 |
| Total. | | 100.5 | 100.5 | 100.5 | 100.5 |
| Viscosity (mPa·s) | 140° C. | 9,100 B | 38,000 D | 3925 A | 4,800 A |
| | 160° C. | 2,100 A | 13,500 D | 1,585 A | 2,500 A |
| Peel strength (g/25 mm) | PE film/ Nonwoven fabric | 100 D | 35 D | 222 A | 168 B |
| | Nonwoven fabric/ Nonwoven fabric | MF A | MF A | 178 B | 133 D |
| Solidification rate | Time (seconds) | 300 or more D | 300 or more D | 300 or more D | 229 D |
| Coatability | Spiral coating air pressure | — | — | 0.34 | 0.4 |
| | Coating temperature | 150 D | >180 D | 137 A | 139 B |

TABLE 2-continued

| | | | | |
|---|---|---|---|---|
| High-speed coating air pressure | — | — | 0.45 | 0.55 |
| Coating temperature | 150 | >180 | 137 | 139 |
| | D | D | D | A |

As shown in Table 1, since the hot melt adhesives of Examples 1 to 6 contain three components (A) a thermoplastic block copolymer, (B) a propylene homopolymer and (C) an ethylene/α-olefin copolymer, they are excellent in adhesion (nonwoven fabric/nonwoven fabric, nonwoven fabric/PE film), and are also excellent in coatability (spiral coatability, high-speed coatability). Therefore, the hot melt adhesives of Examples 1 to 6 are suitable for disposable products such as a diaper and a sanitary good, which are typical nonwoven products.

As shown in Table 2, the hot melt adhesives of Comparative Examples 1 to 9 are inferior in any one of coatabilty and peel strength as compared with the adhesives of Examples 1 to 6. It is apparent that the hot melt adhesives of Examples 1 to 6 are more suitable for disposable products as compared with the hot melt adhesives of Comparative Examples 1 to 9.

INDUSTRIAL APPLICABILITY

The present invention provide a hot melt adhesive. The hot melt adhesive according to The present invention is suited for disposable products.

The invention claimed is:

1. A hot melt adhesive comprising:
   (A) 1-9 parts by weight of a thermoplastic block copolymer which is a copolymer of a vinyl-based aromatic hydrocarbon with a conjugated diene compound;
   (B) 27-35 parts by weight of a propylene homopolymer having a melting point of 100° C. or lower which is obtained by polymerizing propylene using a metallocene catalyst; and
   (C) 1.5-5 parts by weight of an ethylene/α-olefin copolymer obtained by polymerizing with a metallocene catalyst;
   wherein the total weight of the components is 100 parts.

2. The hot melt adhesive according to claim 1, wherein the thermoplastic block copolymer (A) contains at least one selected from:
   (A1) a hydrogenated styrene-butadiene block copolymer (SEBS); and
   (A2) a hydrogenated styrene-isoprene block copolymer (SEPS).

3. The hot melt adhesive according to claim 1, wherein the ethylene/α-olefin copolymer (C) contains at least one selected from an ethylene/propylene copolymer and an ethylene/1-octene copolymer.

4. The hot melt adhesive according to claim 1, further comprising:
   at least one selected from (D) a tackifier resin and (E) a plasticizer, wherein the plasticizer (E) is (E1) a naphthene oil or (E2) a paraffin oil.

5. An article comprising the hot melt adhesive according claim 1.

6. The article of claim 5 which is a disposable product.

* * * * *

UNITED STATES PATENT AND TRADEMARK OFFICE
CERTIFICATE OF CORRECTION

PATENT NO.        : 9,758,704 B2
APPLICATION NO.   : 14/632688
DATED             : September 12, 2017
INVENTOR(S)       : Kentarou Inoue It is certified that error appears in the above-identified patent and that said Letters Patent is hereby corrected as shown below:

Column 1, Line 49: Change "WO 2001 -09490 A" to -- WO 2001 -094690 A --.

Column 2, Line 67: Change "ethylene/a-olefin" to -- ethylene/α-olefin --.

Signed and Sealed this
Twenty-second Day of May, 2018

Andrei Iancu
*Director of the United States Patent and Trademark Office*